June 2, 1964 J. P. FAY 3,135,907
ELECTRIC MOTOR CONTROL BY SHIFTING BRUSHES
Filed Nov. 17, 1959
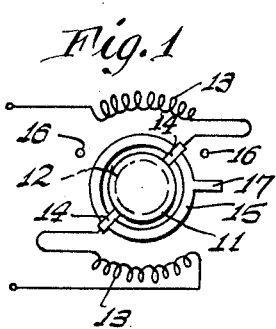
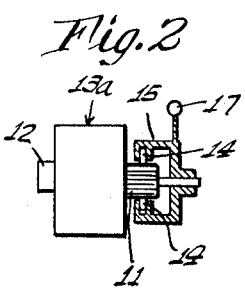
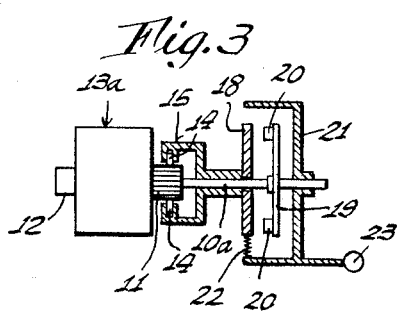
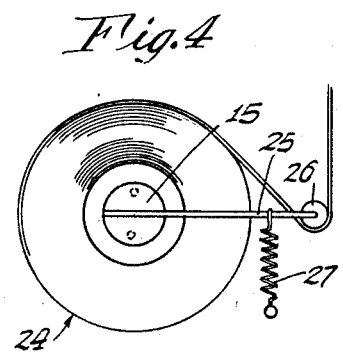
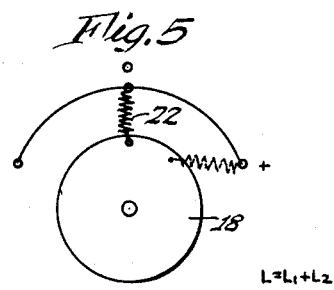
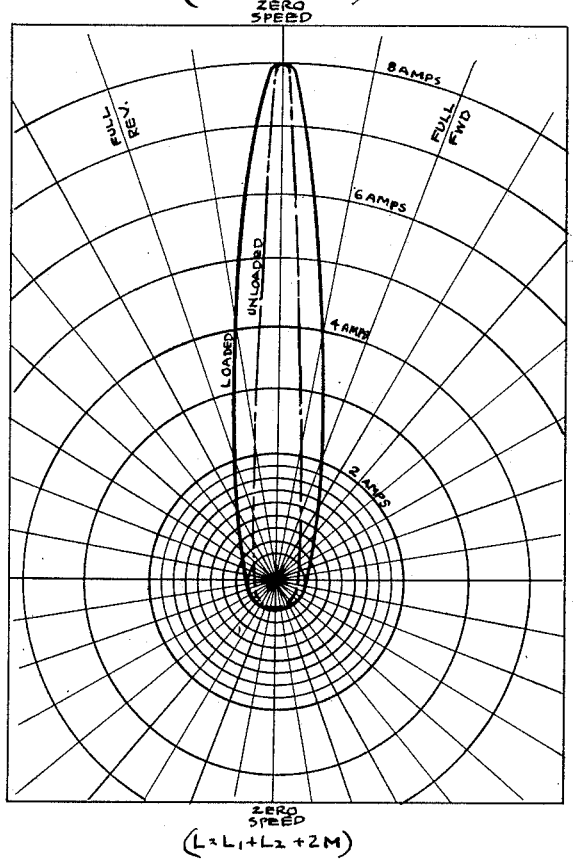
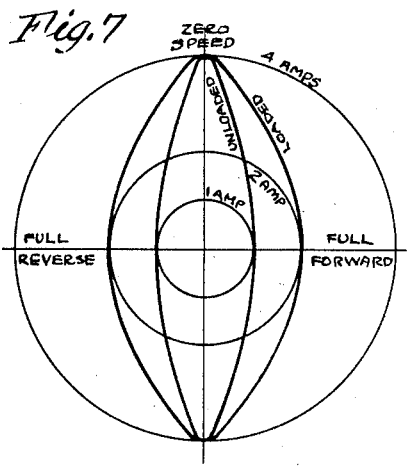
INVENTOR.
James P. Fay
BY
Johnson and Kline
ATTORNEYS

United States Patent Office 3,135,907
Patented June 2, 1964

---

3,135,907
ELECTRIC MOTOR CONTROL BY SHIFTING BRUSHES
James P. Fay, Norwalk, Conn., assignor to The Teletrak Corporation, Wilmington, Del., a corporation of Delaware
Filed Nov. 17, 1959, Ser. No. 853,651
6 Claims. (Cl. 318—361)

The present invention relates to a novel, continuously variable-speed, reversible A.C. motor, and to a method of making the same.

It is an object of the invention to provide an A.C. motor having a commutator and shiftable brushes to vary the speed thereof which in an operative null or no-speed position of the brush draws a low current and which can be rotated in either direction to full speed forward or full speed reverse upon shifting of the brush position so as to provide a continuously varying torque and speed throughout the normal range of operation.

This is accomplished by providing an alternating current motor having a wound rotor, commutator, brushes and a series connected field winding, which field winding and rotor windings form a mutual inductor in which the total inductance in the motor in stalled condition and the brushes in an operative null position is a maximum causing a low current value in the motor and in the other inactive null position of the brushes is a minimum causing a high current value in the motor. In accordance with the present invention stop means are provided which prevent the brushes from being moved to said inactive null position.

A simple and effective method of producing the motor of the present invention is to take a non-compensated universal motor and adjust the turns on the field or armature until the total inductance in the motor in stalled condition and the brushes in an operative null position is a maximum causing a low current value in the motor and in the other inactive null position of the brushes is a minimum causing a high current value in the motor. Also suitable stops are added to the motor to limit the rotation of the brush carrier between full forward and full reverse position.

It has been discovered that when the motor is so designed, the movement of the brushes on either side of the operative null or zero speed position will extend through an arc of greater than the usual 90° on either side of said null position, thus providing a low gradient and a gradual speed variation. Furthermore, inasmuch as the current decreases with speed, the motor can be reversed very quickly and simply.

If desired, means may be provided whereby the motor can be torque responsive or speed responsive. For example, when the motor is used in connection with winding or unwinding material from a reel, it can be utilized to maintain a predetermined tension on the material, i.e. a uniform torque delivered by the motor, whereas when it is desired to have a constant speed motor the carrier for the brushes can be so controlled as to maintain a constant speed under variation of load by means of a governor for controlling the positions of the brushes. This finds use in any machinery, such as milling machines, lathes and drill presses.

Other features and advantages will be apparent from the specification and claims when considered in connection with the accompanying drawings in which:

FIGURE 1 is a schematic view of the motor of the present invention.

FIG. 2 is a diagrammatic view, partly in section, of one form of the invention showing a manual control.

FIG. 3 is a diagrammatic view, partly in section, of another form of the invention showing a constant speed control.

FIG. 4 is a diagrammatic view of another form of the invention showing torque control.

FIG. 5 is a diagrammatic view showing the relative adjustments between the housing and disk of FIG. 3.

FIG. 6 is a current-brush position (speed and torque) chart of the motor of the present invention on A.C.

FIG. 7 is a current-brush position chart of an uncompensated universal motor on D.C. or a compensated motor on A.C. or D.C.

The motor of the present invention provides an A.C. motor 10 having a commutator 11, a wound rotor 12 connected thereto and having a wound field 13 disposed in a stator 13a with the field series connected to the rotor by a pair of brushes engaging the commutator and mounted on a carrier 15 for relative rotation with respect to the field to vary the speed and torque of the motor, the wound rotor and series connected field forming a variable inductor in which the total inductance of the field and rotor winding, with the rotor stalled and the brushes in a null position, conforms to the formulae found in Radio Eng. Handbook, 1st ed. by F. E. Terman as follows:

$$L = L_1 + L_2 \pm 2M$$

and $$M = k\sqrt{L_1 L_2}$$

wherein:
$L$ = total inductance
$L_1$ = inductance of the field
$L_2$ = inductance of the rotor winding
$M$ = mutual inductance factor
$k$ = coefficient of the coupling.

Since the resistance in the circuit and the frequency of the current impressed thereon are constant the impedance of the circuit is substantially proportional to the total inductance. The optimum would be a relationship wherein the inductance of a field has a substantially 1:1 ratio to the inductance of the rotor and $k$ is unity, although this may vary depending upon the construction of the motor so long as the total inductance maintains a safe current value at one no-speed position of the brushes.

When the rotor is stationary and the brushes are in the operative null position corresponding to $L = L_1 + L_2 + 2M$, with $L_1 = L_2$ and $k = 1$, $L = 4L_1$. In the inactive null position corresponding to $L = L_1 + L_2 - 2M$, $L = 0$. Since the impedance is substantially proportional to the total inductance and the current under constant voltage varies inversely as the impedance, the motor will draw a minimum current in the operative null position and a maximum current in the inactive null position. When the brushes have been shifted through 90° to the usual full speed position wherein $k = 0$, the total inductance $L = 2L_1$. However, with the motor running, the counter E.M.F. developed permits the brushes to be moved beyond the usual 90° position and substantially increase the speed without unduly increasing the current drawn by the motor as shown by the chart of FIG. 6.

While the motor can be designed to have a coupling constant as near unity as possible and suitable field and rotor inductance as will produce these characteristics, I have found that the motor of the present invention can be readily produced from a non-compensated universal motor such as described in "Fractional Horsepower Electric Motors" by Cyril G. Veinott (Second edition). The D.C. current-brush curve for such a motor is shown in FIG. 7 wherein the concentric circles represent values of motor current and the radial lines represent the rotative position of the brushes with respect to the field to produce variation as to speed and direction of rotation of the motor from a null or no-speed position. From this chart it will be noted that the current-brush position curve is symmetrical and also it will be noted that with the brushes in the null points a relatively high current of 4 amperes is drawn while with the brushes displaced 90° from the null points to full speed forward or reverse the motor draws 2 amperes under full load or one ampere with no load.

In producing the present motor from a universal motor, the motor is stalled and the brushes are positioned with respect to the field so as to be in the operating null position and the overall inductance measured. The field or rotor winding is then modified by adding or subtracting turns therefrom until the total inductance is of such a value that the current drawn by the motor in stalled position is acceptable and will not overheat the motor.

Preferably the inductance of the field is substantially the same as the inductance of the rotor so that there is in effect substantially a 1:1 ratio therebetween.

With the field connected in series with the rotor through the commutator and brushes and the motor connected to a source of single phase alternating current of predetermined frequency there will be a current-brush position relationship such as shown in FIG. 6. It will be noted that the current-brush position curve has been displaced from that shown in FIG. 7 in the direction of the inactive null and that at the inactive point or position the motor draws a very high current while at the alternate null position it draws a very low current.

From the foregoing it will be seen that by controlling the total inductance and the inductance ratio between the field winding and effective rotor winding and the coupling constant the current at the operating null position can be closely controlled and maintained at a minimum or safe value for the motor.

In the motor illustrated in FIG. 6 the current at the lower or operative null point is 400 milliamperes while at the other or inactive null point a high current is drawn—namely 8 amperes, the amount of current drawn in this latter position being limited only by the resistance in the circuit.

Referring back to the charts of FIGS. 6 and 7 it will be noted in FIG. 7 that the current for the various positions of the brush between operative null and full speed forward or reverse gradually decreases to said full speed in which position the motor is drawing two amperes when loaded and one ampere in unloaded condition. From FIG. 6 it will be noted that with the motor of the present invention as the speed decreases from full speed wherein it draws the same current as the motor of FIG. 7, the current decreases to the minimum current of 400 milliamperes and as the motor is reversed the current increases in the same relationship as in the forward speed direction.

Stops 16 are provided on the motor to cooperate with the carrier 15 to limit the movement thereof to the desired operative range of the motor and to prevent the brushes from being moved beyond the full speed forward and full speed reverse position so that it is impossible to move the brushes to the inactive null position in which excessive current is drawn by the motor.

Furthermore, as shown in FIG. 6 the full speed forward and full speed reverse positions are displaced substantially greater than 90° from the operative null or zero speed position as is the case when the motor is used as a D.C. motor as shown in FIG. 7. Specifically the full speed forward or reverse is 160° from the low current null position. This provides a lower gradient and produces a smooth and accurately controlled speed or torque variation in the motor in either direction of rotation.

As shown in FIG. 2, the carrier for the brushes is provided with a handle 17 so that the brushes can be manually controlled to vary the speed.

In the form of the invention shown in FIG. 3 the motor is to be used under constant speed conditions such as for milling machines, drill presses and the like. Here the brushes are connected to a governor which shifts the brushes with respect to the field in order to maintain the desired speed in the motor. While any governor capable of shifting the brushes may be used, in the form of the invention shown in FIG. 3, a novel governor mechanism is employed in which a metallic disk 18 such as aluminum or the like is connected to the carrier 15 for the brushes and the motor shaft 10a has mounted thereon a disk 19 having a plurality of permanent magnets 20 facing the aluminum disk to cooperate therewith to form a slip drive for the disk tending to return the disk to zero speed setting. The disk is connected to an adjustable housing 21 by means of a spring 22 as diagrammatically shown in FIG. 5. The housing has a handle 23 whereby it can be adjusted to various speed positions. With the housing positioned as shown in FIG. 5, the spring is in position to hold the brushes in zero speed position. If the housing is moved so as to position the spring in the dotted position, the balance between the tension in the spring and the drag of the drive between the aluminum disk and magnets carried by the disk on the motor shaft will retain the brushes in proper position to maintain the desired speed.

In the form of the invention shown in FIG. 4, the motor is used as a constant torque motor and is connected to a reel 24 of material which is adapted to be wound or unwound. An arm 25 having a roller 26 over which the material passes is connected to the brush carrier and is biased by a spring 27 to a predetermined position in which the predetermined tension is applied to the material. An increase in tension in the material will cause the arm to move in a counter clockwise direction to shift the brushes to change the torque applied by the motor so as to relieve the tension and maintain the uniform tension in the material. Similarly, if the tension in the material decreases, the slack in the loop of the material will cause the arm to move in a clockwise direction to cause the motor to operate to take up the slack material so as to maintain the predetermined tension in the material.

Variations and modifications may be made within the scope of the claims and portions of the improvements may be used without others.

I claim:

1. A continuously variable-speed, reversible, A.C. motor having a commutator and a wound rotor connected thereto and having a wound field connected in series with said rotor, means mounting a pair of brushes for cooperating with said commutator, and speed responsive means for shifting the mounting means to alter the position of the brushes with respect to the field for maintaining a predetermined speed and direction of rotation of said motor, the field and effective rotor windings forming a mutual inductor in which the total inductance in the motor in stalled condition and the brushes in an operative null position is a maximum causing a low current value in the motor and in the other inactive null position of the brushes is a minimum causing a high current value in the motor; and means for limiting the rotation of the brush mounting means on either side of said operative null position in full speed forward or reverse position whereby said brushes are prevented from passing through the inactive null position and the current value is limited to a safe current value for the motor, said speed responsive means comprising a metallic disk-like member connected to the carrier, a plate rotatable with the rotor and having a plurality of magnets facing the plate and forming a slip drive therefor adapted to rotate said metallic disk in the direction to move the brushes to null position, an adjustable member connected to said disk-like member by a spring means, adjustment of the member from a zero speed position tensioning said spring to counterbalance the drawing force of said magnets whereby the brushes are maintained in the desired position to produce a constant speed.

2. A governor for use with a continuously variable-speed motor having a commutator and a pair of brushes mounted on a carrier for cooperating with said commutator and adjustable with respect thereto for changing the torque and the speed and direction of rotation of said motor, said governor comprising a metallic disk connected to the carrier, a plate rotatable with the motor and having a plurality of magnets facing the metallic disk and forming a slip drive therewith adapted to rotate said metallic disk in the direction to move the brushes to null position; and an adjustable member connected to said disk by a spring means, adjustment of the member from a zero speed position tensioning said spring to counterbalance the driving force of said magnets whereby the brushes are maintained in the desired position to produce a constant speed.

3. A governor for use with a continuously variable-speed, reversible, A.C. motor adapted to have single phase alternating current applied thereto, a commutator and a wound rotor connected thereto and having a wound field connected in series with said rotor by means of a pair of brushes mounted on a carrier for cooperating with said commutator and adjustable with respect thereto for changing the torque and the speed and direction of rotation of said motor, the field and effective rotor windings forming a mutual inductor in which the total inductance in the motor in stalled condition and the brushes in an operative null position is a maximum causing a low current value in the motor and in the other inactive null position of the brushes is a minimum causing a high current value in the motor, and means for limiting the adjustment of the brushes on either side of said operative null position in full speed forward or reverse position whereby said brushes are prevented from passing through the inactive null position and the current value is limited to a safe current value for the motor, said governor comprising a metallic disk-like member connected to the carrier, a plate rotatable with the rotor and having a plurality of magnets facing the disk-like member and forming a slip drive therefor adapted to rotate said metallic disk-like member in the direction to move the brushes to null position, and an adjustable member connected to said disk-like member by a spring means, adjustment of the member from a zero speed position tensioning said spring to counterbalance the drivng force of said magnets whereby the brushes are maintained in the desired position to produce a constant speed.

4. A governor for use with a continuously variable-speed motor having a commutator and a pair of brushes mounted on a carrier for cooperating with said commutator and adjustable with respect thereto for changing the torque and the speed and direction of rotation of said motor, said governor comprising a metallic disk member and a cooperable plate member having a plurality of magnets facing the metallic disk and forming a slip drive therewith, one of said members being connected to the carrier and the other to the rotor, said slip drive being adapted to move the brushes to null position; and an adjustable member connected to the member connected to the brushes by a spring means, adjustment of the member from a zero speed position tensioning said spring to counterbalance the driving force of said magnets whereby the brushes are maintained in the desired position to produce a constant speed.

5. A governor for use with a continuously variable-speed motor having a commutator and a pair of brushes mounted on a carrier for cooperating with said commutator and adjustable with respect thereto for changing the torque, speed and direction of rotation of said motor, said governor comprising a first member connected to the carrier, a second member rotatable with the motor and having means cooperating with the first member forming a slip drive therebetween adapted to rotate said first member in the direction to move the brushes to null position, and an adjustable member connected to said first member by a spring means, adjustment of the adjustable member from a zero speed position tensioning said spring to counterbalance the driving force of said slip drive, whereby the brushes are maintained in the desired position to produce a constant speed.

6. In combination with a continuously variable-speed, reversible, A.C. motor adapted to have single phase alternating current applied thereto, a commutator and a wound rotor connected thereto and having a wound field connected in series with said rotor by means of a pair of brushes mounted on a carrier for cooperating with said commutator and adjustable with respect thereto for changing the torque and the speed and direction of rotation of said motor, the field and effective rotor windings forming a mutual inductor in which the total inductance in the motor in stalled condition and the brushes in an operative null position is a maximum causing a low current value in the motor and in the other inactive null position of the brushes is a minimum causing a high current value in the motor, and means for limiting the adjustment of the brushes on either side of said operative null position in full speed forward or reverse position whereby said brushes are prevented from passing through the inactive null position and the current value is limited to a safe current value for the motor, of a governor comprising a first member connected to the carrier, a second member rotatable with the motor and having means cooperating with the first member forming a slip drive therebetween adapted to rotate said first member in the direction to move the brushes to null position, and an adjustable member connected to said first member by a spring means, adjustment of the adjustable member from a zero speed position tensioning said spring to counterbalance the driving force of said magnets whereby the brushes are maintained in the desired position to produce a constant speed.

References Cited in the file of this patent

UNITED STATES PATENTS

| | | |
|---|---|---|
| 1,304,958 | Tynn | May 27, 1919 |
| 2,550,422 | Naul | Apr. 24, 1951 |
| 2,774,925 | Warner | Dec. 18, 1956 |